(12) United States Patent
Jin et al.

(10) Patent No.: US 9,800,658 B2
(45) Date of Patent: Oct. 24, 2017

(54) SERVERS AND METHODS FOR CONTROLLING A SERVER

(71) Applicant: Marvell International Ltd., Hamilton (BM)

(72) Inventors: Chao Jin, Singapore (SG); Weiya Xi, Singapore (SG); Pantelis Sophoclis Alexopoulos, Singapore (SG); Chun Teck Lim, Singapore (SG)

(73) Assignee: Marvell International Ltd., Hamilton (BM)

( * ) Notice: Subject to any disclaimer, the term of this patent is extended or adjusted under 35 U.S.C. 154(b) by 151 days.

(21) Appl. No.: 14/417,032

(22) PCT Filed: Jul. 30, 2013

(86) PCT No.: PCT/SG2013/000318
§ 371 (c)(1),
(2) Date: Jan. 23, 2015

(87) PCT Pub. No.: WO2014/021779
PCT Pub. Date: Feb. 6, 2014

(65) Prior Publication Data
US 2015/0281354 A1    Oct. 1, 2015

Related U.S. Application Data

(60) Provisional application No. 61/677,054, filed on Jul. 30, 2012.

(51) Int. Cl.
*H04L 29/08* (2006.01)
*H04W 4/00* (2009.01)
*H04W 8/22* (2009.01)

(52) U.S. Cl.
CPC ......... *H04L 67/1097* (2013.01); *H04W 4/003* (2013.01); *H04W 8/22* (2013.01)

(58) Field of Classification Search
USPC ............................... 709/212, 213, 245, 223
See application file for complete search history.

(56) References Cited

U.S. PATENT DOCUMENTS

| 2006/0148529 | A1  | 7/2006 | Yoon et al. |         |
|--------------|-----|--------|-------------|---------|
| 2008/0229025 | A1* | 9/2008 | Plamondon   | G06F 12/0862 711/126 |
| 2014/0101377 | A1* | 4/2014 | Oh          | G06F 12/0246 711/103 |

(Continued)

FOREIGN PATENT DOCUMENTS

WO    WO-03-021441 A1    3/2003

OTHER PUBLICATIONS

International Search Report for PCT/SG2013/000318, mailed Oct. 25, 2013; ISA/AU.

*Primary Examiner* — Lan-Dai T Truong

(57) ABSTRACT

According to various embodiments, a server may be provided. The server may include: a first memory configured to store data of a first kind; a second memory configured to store data of a second kind; a wireless transceiver configured to transmit data stored in the first memory and data stored in the second memory, and configured to receive data; and a memory selection circuit configured to determine whether to store the received data in the first memory or to store the received data in the second memory.

33 Claims, 11 Drawing Sheets

(56) References Cited

U.S. PATENT DOCUMENTS

2014/0108211 A1* 4/2014 Bogdanov .............. G06Q 40/02
                                              705/30
2014/0292490 A1* 10/2014 Butler .................. G06K 7/0008
                                              340/10.1

* cited by examiner

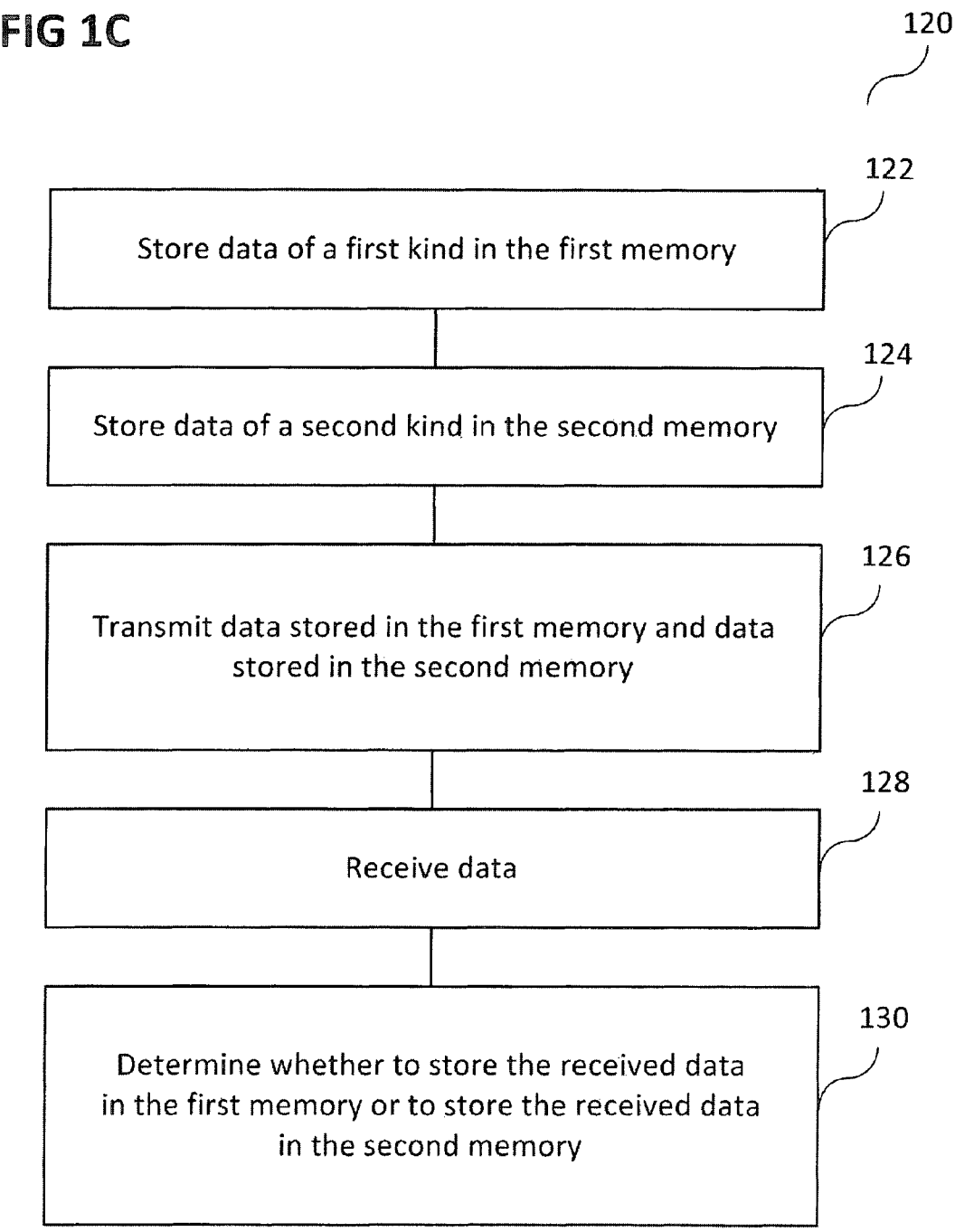

SERVERS AND METHODS FOR CONTROLLING A SERVER

CROSS-REFERENCE TO RELATED APPLICATION

The present application is a National Stage of International Application No. PCT/SG2013/000318, filed on 30 Jul. 2013, which claims the benefit of the U.S. provisional patent application No. 61/677,054 filed on 30 Jul. 2012, the entire contents of which are incorporated herein by reference for all purposes.

TECHNICAL FIELD

Embodiments relate generally to servers and methods for controlling a server.

BACKGROUND

Mobile devices such as mobile phones or handheld computers are using increasing amounts of storage for programs and data. Thus, there may be a need for an efficient and effective storage for mobile devices.

SUMMARY

According to various embodiments, a server may be provided. The server may include: a first memory configured to store data of a first kind; a second memory configured to store data of a second kind; a wireless transceiver configured to transmit data stored in the first memory and data stored in the second memory, and configured to receive data; and a memory selection circuit configured to determine whether to store the received data in the first memory or to store the received data in the second memory.

According to various embodiments, a method for controlling a server including a first memory and a second memory may be provided. The method may include: storing data of a first kind in the first memory; storing data of a second kind in the second memory; transmitting data stored in the first memory and data stored in the second memory; receiving data; and determining whether to store the received data in the first memory or to store the received data in the second memory.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1C shows a flow diagram illustrating a method for controlling a server according to various embodiments;

DESCRIPTION

Figure 1A:
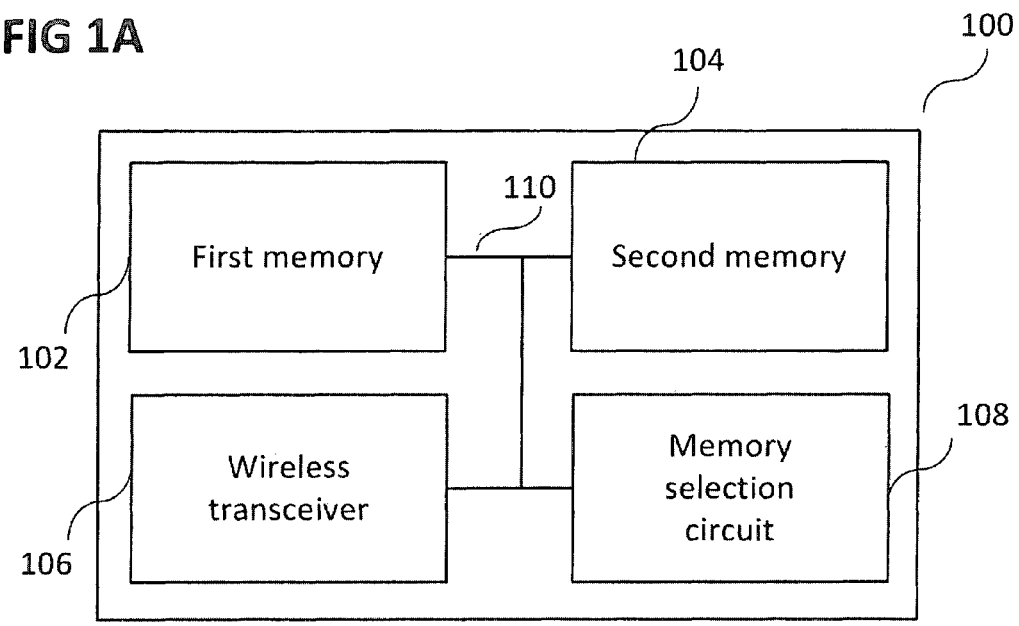
FIG. 1A shows a server according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the server as described in this description may include a memory which is for example used in the processing carried out in the server. In this context, the radio communication device as described in this description may include a memory which is for example used in the processing carried out in the radio communication device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

A non-volatile memory (NVM) according to various embodiments may be understood as any storage or memory different from a hard disk drive configured to store data, for example a powered DRAM (Dynamic Random Access Memory) or for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory. An NVM may also be referred to as a SSD (solid state drive).

A radio communication device may be any kind of radio communication device, such as a mobile device or a mobile radio communication device, for example a hand phone, a mobile phone, a mobile station, a PDA (personal digital assistant), a handheld computer, a tablet or a desktop computer. It will be understood that features described for any embodiment described for one of these devices may also be present in any other radio communication device.

A server according to various embodiments may also be referred to as a mobile server, or may also be referred to as a system according to various embodiments.

Mobile devices such as mobile phones or handheld computers are using increasing amounts of storage for programs and data. Thus, there may be a need for an efficient and effective storage for mobile devices.

Nowadays most hand phones are "multi-function" devices. Besides making or receiving phone calls, they may be used as a camera, video recorder/player, PDA (personal digital assistant), internet browser, and GPS (global positioning system), for example. These applications may generate a large amount of data or may require accessing a large amount of data. However, due to the space constrains of hand phones and cost, the storage capacity attached with the hand phones may be limited and far less than the storage capacity the applications require. Most hand phones may depend on 3G (Third Generation) connection for extra storage. 3G connect normally may be expensive and may not be available everywhere. Therefore, different ways to extend storage capacity for hand phones may be desired.

According to various embodiments, systems and methods for hand phones to expand their storage capacity through a shared hybrid thin mobile storage may be provided.

According to various embodiments, a portable mobile storage system (for example a mobile server) may enlarge the limited storage capacity of hand phone devices tremendously. The system (for example mobile server) according to various embodiments may connect to hand phone devices through WIFI. Users may be able to use the storage as if it is an internal storage attached to hand phones. Users may manage data in the system (for example mobile server), and may install and run application programs in it, and even boot from it.

According to various embodiments, the system may be a hybrid storage system including both non-volatile memory (NVM) and a disk. Intelligent data management, cache and scheduling methods to allocate and move data between the two types of storage media may be provided. The strategies may extend the battery life, and may improve the system reliability and performance.

According to various embodiments, an architecture design for an external wireless storage system with low power consumption (for example a mobile server) may be provided to enlarge capacity of a hand phone with a Linux-like OS (operating system) and may be used as if it is a local drive.

FIG. 1A shows a server 100 according to various embodiments. The server 100 may include a first memory 102 configured to store data of a first kind. The server 100 may further include a second memory 104 configured to store data of a second kind. The server 100 may further include a wireless transceiver 106 configured to transmit data stored in the first memory 102 and data stored in the second memory 104. The wireless transceiver 106 may further be configured to receive data. The server 100 may further include a memory selection circuit 108 configured to determine whether to store the received data in the first memory 102 or to store the received data in the second memory 104. The first memory 102, the second memory 104, the wireless transceiver 106, and the memory selection circuit 108 may be coupled with each other, like indicated by lines 110, for example electrically coupled, for example using a line or a cable, and/or mechanically coupled.

In other words, the server 100 may include two or more separate memory portions, and may wirelessly transmit data stored in the two memory portions, and, upon wirelessly receiving data, decide in which of the two or more separate memory portions the wirelessly received data should be stored.

The memory selection circuit 102 may further be configured to determine a kind of the received data, and may determine whether to store the received data in the first memory 102 or to store the received data in the second memory 104 based on the determined kind of the received data.

The wireless transceiver 106 may be or may include a transceiver (which may be understood as a receiver and a transmitter), for example according to WiFi, wireless local area network (WiFi), Bluetooth, ZigBee, infrared (IR) or any other short range radio access technology, for example any other personal area network radio access technology.

The first memory 102 and the second memory 104 may be different memories, and may be provided as separate devices or may be a combined device, for example provided in a common housing. The first kind and the second kind may be different.

According to various embodiments, the first memory 102 may include or may be a hard disk drive.

According to various embodiments, the second memory 104 may include or may be a solid state drive.

According to various embodiments, data of the first kind may include or may be data of a file size of more than a pre-determined size threshold. According to various embodiments, data of the second kind may include or may be data of a file size of less (or equal) than the pre-determined size threshold.

According to various embodiments, data of the second kind may include or may be operating system data and/or file system metadata, and/or applications, and/or applications' run time data.

According to various embodiments, data of the first kind may include or may be data of an access frequency less than a pre-determined frequency threshold. According to various embodiments, data of the second kind may include or may be data of an access frequency more than (or equal) than the pre-determined frequency threshold.

Figure 1B:
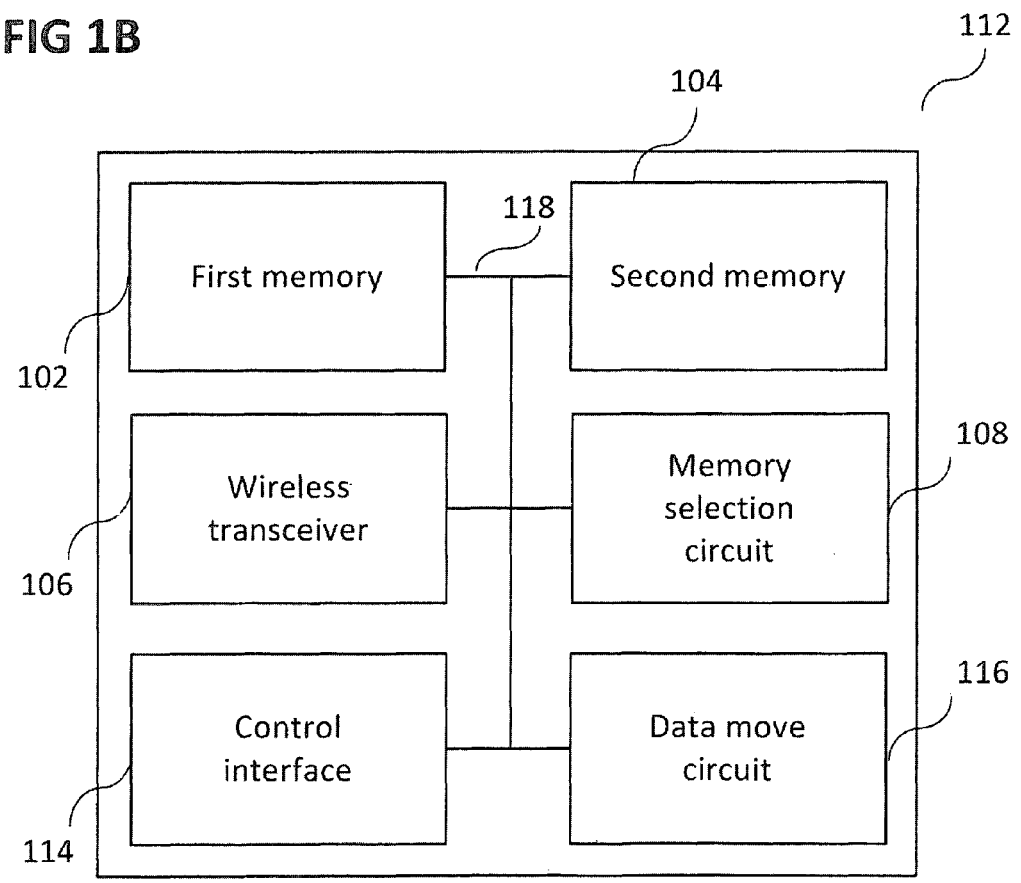
FIG. 1B shows a server according to various embodiments.

FIG. 1B shows a server 112 according to various embodiments. The server 112 may, similar to the server 100 of FIG. 1A, include a first memory 102. The server 112 may, similar to the server 100 of FIG. 1A, further include a second memory 104. The server 112 may, similar to the server 100 of FIG. 1A, further include a wireless transceiver 106. The server 112 may, similar to the server 100 of FIG. 1A, further include a memory selection circuit 108. The server 112 may further include a control interface 114 configured to receive control information. The server 112 may further include a data move circuit 116 configured to move data from the first memory 102 to the second memory 104 or move data from the second memory 104 to the first memory 102, based on the received control information.

According to various embodiments, the control interface 114 may be configured according to a hypertext transfer protocol.

According to various embodiments, the wireless transceiver 106 may be configured according to a network file system (NFS) protocol and/or a common Internet file system (CIFS) protocol.

According to various embodiments, the wireless transceiver 106 may be configured to communicate with a plurality of radio communication devices (not shown). The first memory 102 may include a plurality of first portions. Each first portion may be configured to store data of the first kind of one radio communication device of the plurality of radio communication devices. The second memory 104 may include a plurality of second portions. Each second portion may be configured to store data of the second kind of one radio communication device of the plurality of radio communication devices.

FIG. 1C shows a flow diagram 120 illustrating a method for controlling a server including a first memory and a second memory. In 122, data of a first kind may be stored in the first memory. In 124, data of a second kind may be stored in the second memory. In 126, data stored in the first memory and data stored in the second memory may be transmitted (for example to a radio communication device). In 128, data may be received (for example from the radio communication device). In 130, it may be determined whether to store the received data in the first memory or to store the received data in the second memory.

According to various embodiments, the first memory may include or may be a hard disk drive.

According to various embodiments, the second memory may include or may be a solid state drive.

According to various embodiments, data of the first kind may include or may be data of a file size of more than a pre-determined size threshold. According to various embodiments, data of the second kind may include or may be data of a file size of less (or equal) than the pre-determined size threshold.

According to various embodiments, data of the second kind may include or may be operating system data and/or file system metadata, and/or applications, and/or applications' run time data.

According to various embodiments, data of the first kind may include or may be data of an access frequency less than a pre-determined frequency threshold. According to various embodiments, data of the second kind may include or may be data of an access frequency more than (or equal) than the pre-determined frequency threshold.

According to various embodiments, the method may further include: receiving control information; and moving data from the first memory to the second memory or moving data from the second memory to the first memory, based on the received control information.

According to various embodiments, the method may further include receiving the control information according to a hypertext transfer protocol.

According to various embodiments, the method may further include transmitting the data and receiving the data according to a network file system (NFS) protocol and/or a common Internet file system (CIFS) protocol.

According to various embodiments, the method may further include transmitting the data to and receiving the data from a plurality of radio communication devices. The first memory may include a plurality of first portions. The second memory may include a plurality of second portions. The method may further include: storing data of the first kind of one radio communication device of the plurality of radio communication devices; and storing data of the second kind of one radio communication device of the plurality of radio communication devices.

According to various embodiments, a slim portable mobile storage system may be provided to enlarge limited storage capacity of hand phone devices with Linux-like OS (operating system). The system according to various embodiments may connect to hand phone devices through WIFI. Hand phone users may use the system as if it is part of the internal storage of the hand phones. Through their hand phones, users may manage storage and data of the system, install application programs, run application programs from it and even boot their hand phones from the system.

The system according to various embodiments may connect to multiple hand phone devices simultaneously and share data among different devices. Management functions such as user account creation may be provided through a web browser on the hand phones.

The system according to various embodiments may be a hybrid storage system which consists of both NVM (non-volatile memory) and disk storage. Compared to a storage system with pure solid state, the hybrid storage system according to various embodiments may provide much larger storage capacity with much lower cost. The system may also be implemented with intelligent data management, cache and scheduling methods for data allocation and movement between the two types of storage media. This may extend the battery life, and may improve the system reliability and performance.

According to various embodiments, the system may be a slim portable mobile hybrid storage system, which may be designed for hand phone devices with Linux-like OS to enlarge their limited storage capacity. The system may connect to hand phones through a wireless network. Through hand phones, users may access the storage as if it is an internal storage attached to the hand phones. Users may manage storage and data of the system, install and run application programs from it and even boot hand phones from the system.

According to various embodiments, the system may be installed with a Linux Operating System (OS) and may be configured as a Network Attached Storage (NAS) server. The hand phones devices may be configured as Network File System (NFS) clients. Multiple hand phones client may connect and may use the storage server simultaneously for file sharing.

According to various embodiments, the system may be a hybrid storage system with both disk storage and non-volatile memory (NVM) embedded inside a small and thin enclosure. The NVM may be used as either cache or fast storage tier.

The NVM may be divided into two portions. One portion may be configured to store server OS (operating system) data and server applications data, and the other portion of the NVM may be configured to store frequently used applications installed by users and frequently accessed user data. With these data kept in the NVM, the spindle motor may be powered off most of time and therefore the power consumption may be reduced and the battery life may be extended.

According to various embodiments, there may be provided intelligent data allocation, cache and scheduling methods designed based on the file-level data access monitoring for data allocation, caching or movement between the NVM and the disk media automatically. Users may also have an option to move data between the two types of storage media through web-based GUI (graphical user interface) on their hand phones.

Figure 2:
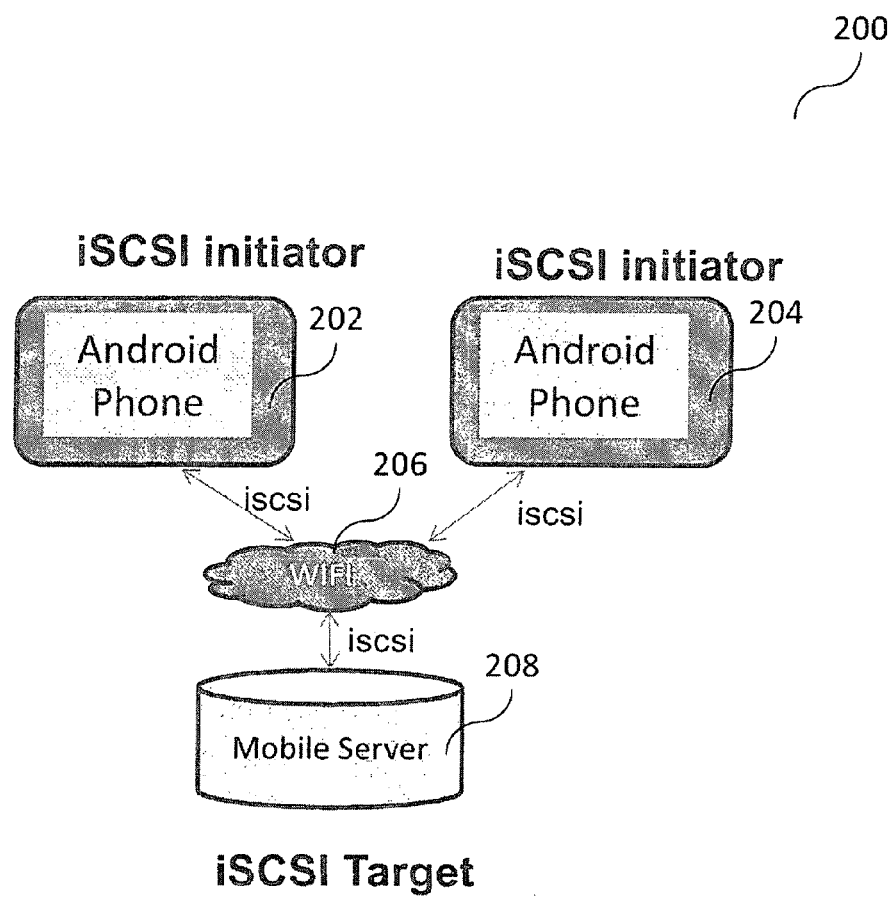
FIG. 2 shows a Storage Area Network system.

FIG. 2 shows a Storage Area Network (SAN) system 200. SAN may provide access to consolidated block level data storage. SAN may make storage devices accessible to clients so that the devices appear like locally attached devices. According to various embodiments, iSCSI (SCSI (Small Computer System Interface) over Internet Protocol) may be used as network protocol. For example, two mobile devices (for example a first Android phone 202 and a second Android phone 204) may access a mobile server 208 using a wireless network (for example a WiFi network 206).

Figure 3:
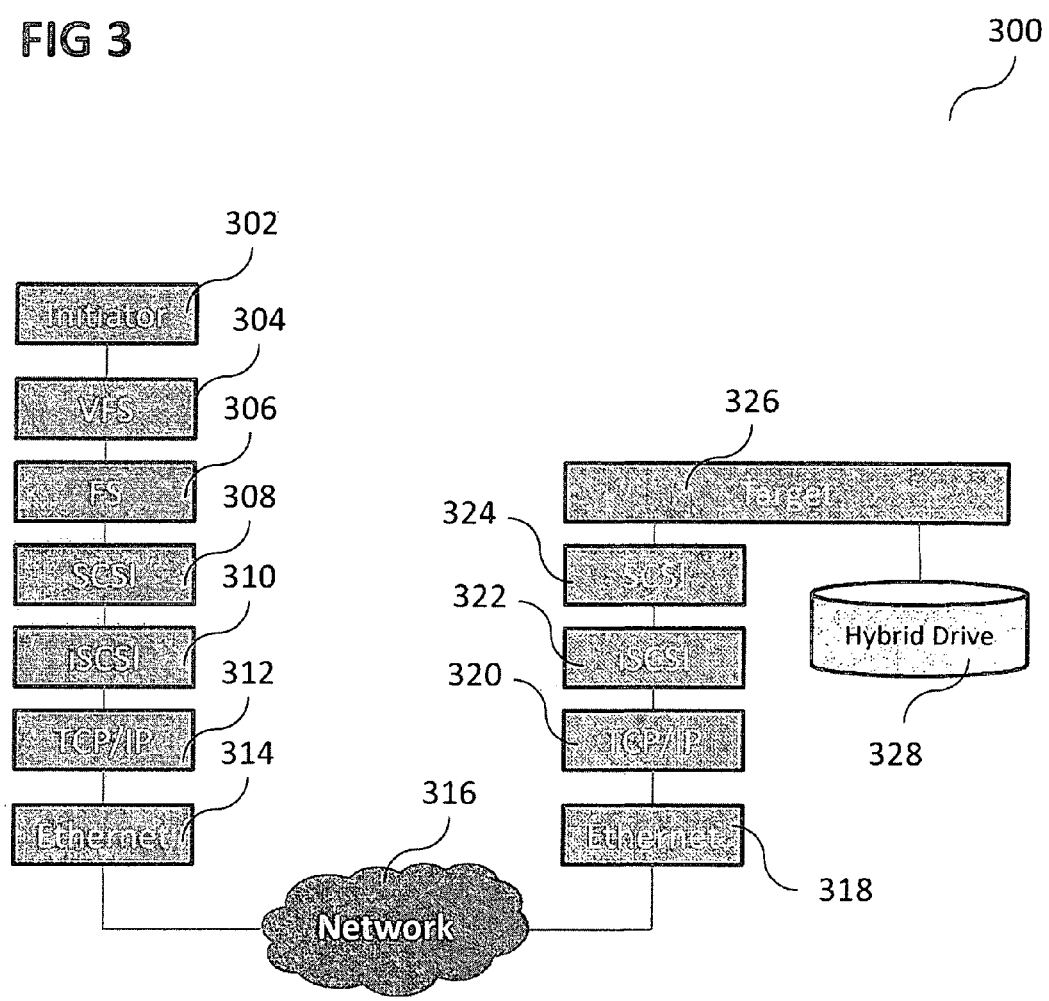
FIG. 3 shows an architecture of a Storage Area Network system.

FIG. 3 shows an architecture 300 of a Storage Area Network system. Modules for an initiator 302, a VFS (virtual file system) 304, a FS (file system) 306, a SCSI 308, an iSCSI 310, a TCP/IP (Transmission Control Protocol/Internet Protocol) 312, and an Ethernet 314 may be provided on the mobile device side. The mobile device may be connected via a network 316 to the server. Modules for Ethernet 318, TCP/IP 320, iSCSI 322, SCSI 324, a target 326, and a hybrid drive 328 may be provided on the server side.

Current Android OS FS may not support SCSI/iSCSI. FS development work in the kernel may thus be provided.

In a further embodiment, a system based on Network Attached Storage (NAS) and NFS (Network File System) may be provided. Some Android phones may support NFS. Users may root the phone to mount NFS. According to various embodiments, compared to SAN, less kernel development work may be provided.

Figure 4:
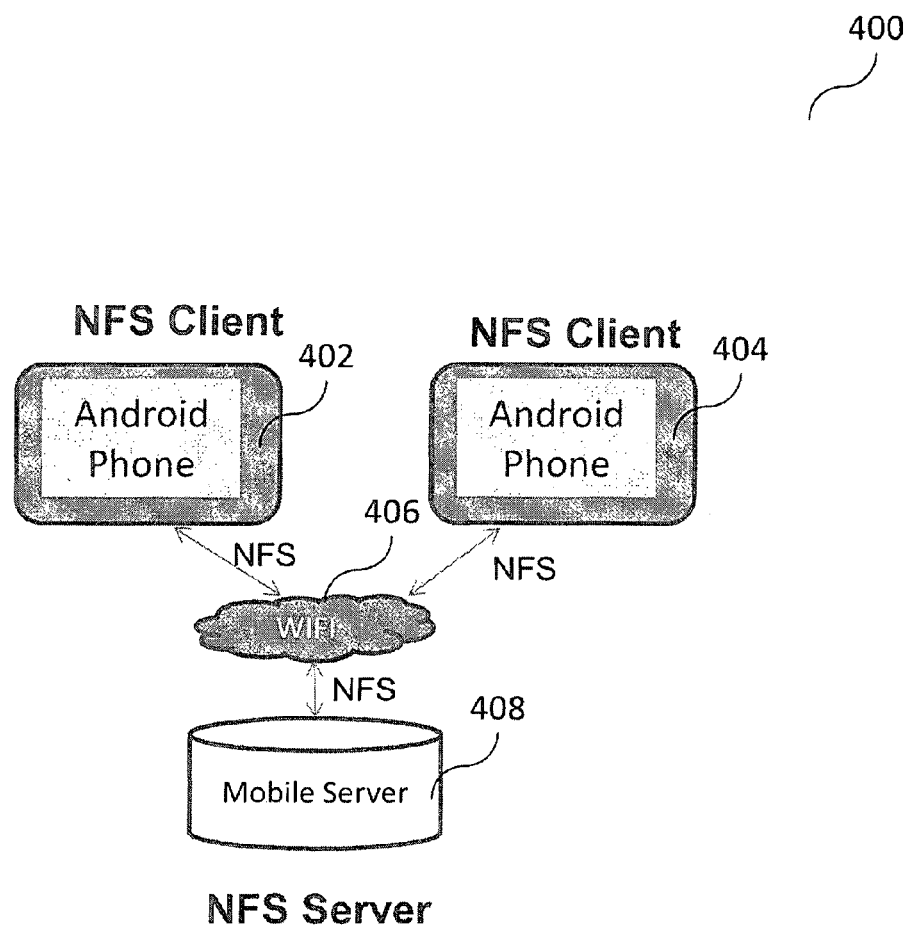
FIG. 4 shows an illustration of an architecture for hand phones connecting to a system according to various embodiments.

FIG. 4 shows an illustration 400 of an architecture for hand phones (for example a first hand phone 402 and a second hand phone 404) connecting to a system according to various embodiments, for example as a Network Attached Storage (NAS). NAS may be a file-level data storage appliance connected to network providing data access to a client on the network. The client may mount the file system on the sever and may access the data as if they are locally. According to various embodiments, the network protocol used may be a Network File System (NFS; for example in a Linux system or a UNIX system). The Network File System may allow hand phones to mount the file system (for example provided in a mobile server 408) over a Ethernet/WiFi connection 405 and interact with the file system as though they are mounted locally. The hand phones may install an NFS client module, while the system may be configured as NFS server.

The NFS client server architecture may allow multiple hand phones to access the system simultaneously.

Once the hand phones mount to the system, the hand phones can use the storage as if it is an internal storage attached to the devices. Through the hand phones, users may manage storage and data, install and run applications and even boot the phones from the system.

Figure 5:
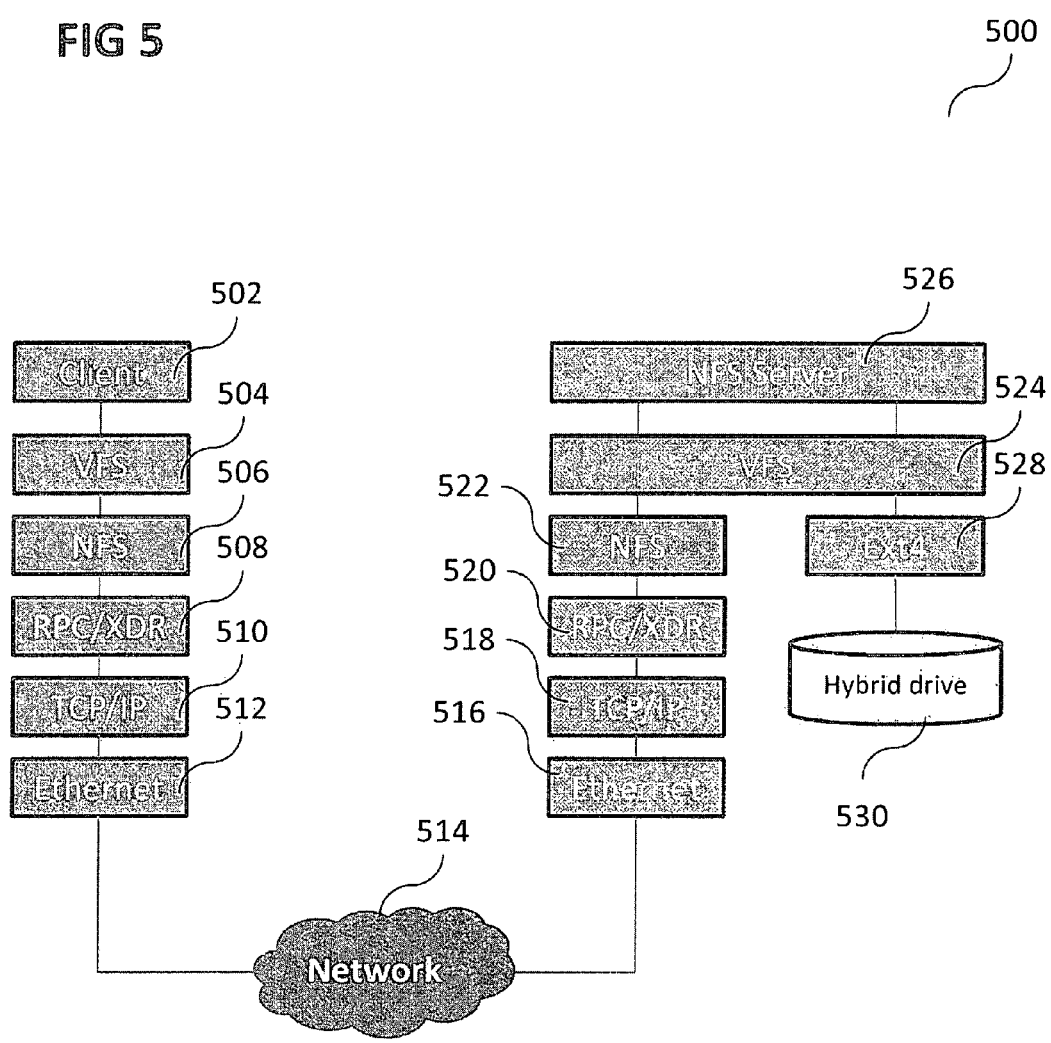
FIG. 5 shows an architecture according to various embodiments.

FIG. 5 shows an architecture 500 according to various embodiments. Modules for an client 502, a VFS (virtual file system) 504, an NFS (network file system) 506, a RPC (Remote Procedure Call)/XDR (external Data Representation) 508, a TCP/IP (Transmission Control Protocol/Internet Protocol) 510, and an Ethernet 512 may be provided on the mobile device side. The mobile device may be connected via a network 514 to the server. Modules for Ethernet 516, TCP/IP 518, RPC/XDR 520, NFS 522, VFS 524, NFS server 526, Ext4 528 and a hybrid drive 530 may be provided on the server side. For example, the mobile device (for example an Android phone) may support NFS (and thus may implement the module for NFS 506 and RPC/XDR 508).

According to various embodiments, the server may provide storage that may be accessed like a local storage. Like other local FS, NFS may be mounted on the VFS and applications may access it like any local FS. The hybrid drive according to various embodiments may appear as a memory drive on the hand phone for users to access, and may allow data (or file) sharing and installation and running of application programs.

To enable the hand phone to be booted from the system (in other words: to boot over the wireless network or to boot from the wireless server (or wireless drive)) according to various embodiments (in other words: to boot from the wireless hybrid drive according to various embodiments; for example to boot an Android OS with the wireless hybrid drive according to various embodiments), the following may be provided: The phone BIOS (Basic Input/Output System) may be modified to enable network booting; nfs.ko may be loaded into a hand phone kernel (for example an Android kernel) and the kernel image may be built (or rebuilt); the kernel image may be stored in the (hybrid) drive according to various embodiments.

Figure 6:
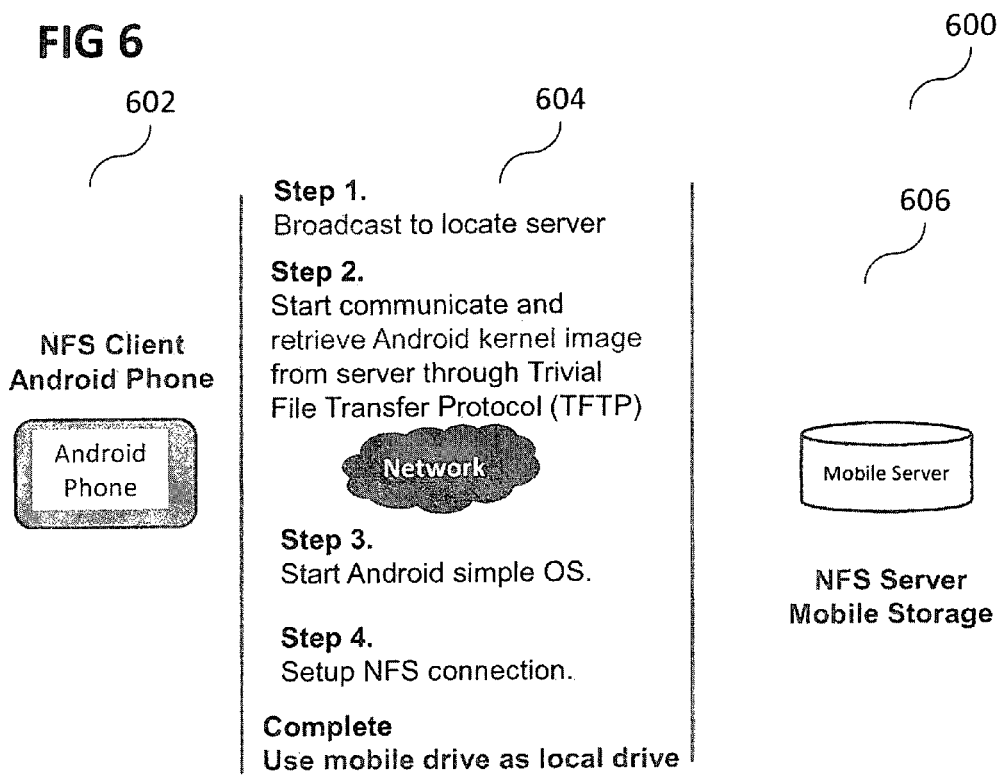
FIG. 6 shows an illustration of a procedure of booting of a hand phone over a network.

FIG. 6 shows an illustration 600 of a procedure of booting of a hand phone over a network, for example illustrating four major steps for booting from the system. A mobile device side 602, a network side 604, and a server side 606 are illustrated.

In a first step, the hand phone may broadcast to locate the system according to various embodiments. In a second step, once the server is identified, communication may be setup. The hand phone then may retrieve the kernel image from the server and may store it in the phone through Trivial File Transfer Protocol (TFTP). In a third step, once the kernel image is downloaded, the hand phone may start to run the OS. In a fourth step, once the system is up, the hand phone may mount the system through NFS. Once the mounting is successful, the hand phone may use the system as an attached storage.

In the following, NV cache Management and power saving will be described.

Figure 7:
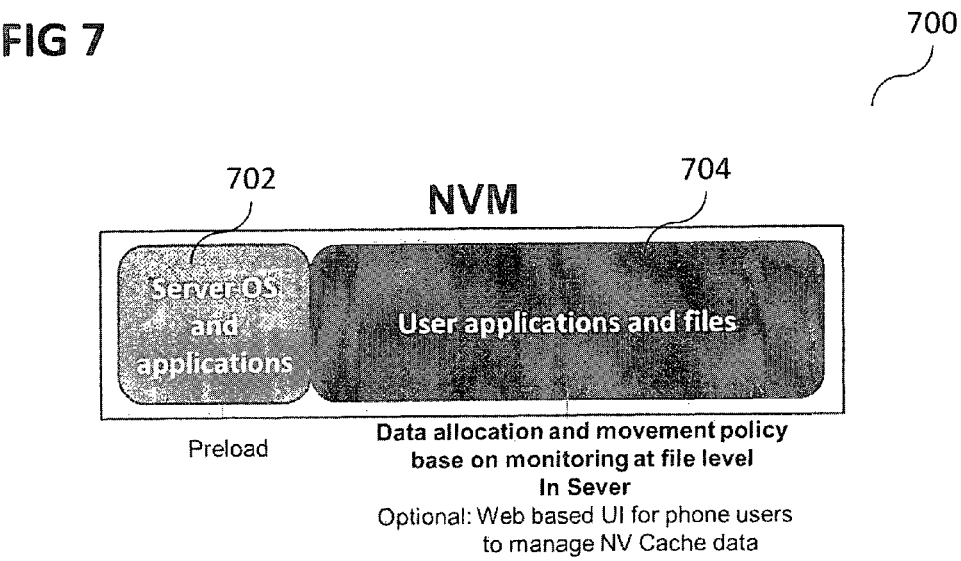
FIG. 7 shows an illustration of non-volatile memory data management and allocation according to various embodiments.

FIG. 7 shows an illustration 700 of NVM data management and allocation according to various embodiments. FIG. 7 shows the two partitions of the NVM in the system. One partition (for example a first partition 702) may be configured to store server OS data and server applications data. The other partition (for example a second partition 704) may be configured to keep frequently used applications installed by users and frequently accessed user data. The data kept in the first partition 702 may be fixed and may be preloaded by manufacturers. The data stored in the second partition 704 may be dynamic. Intelligent data allocation, cache and scheduling methods may be provided to move data automatically between the later partition of the NVM and disk so that most of the requests need only access the NVM. Therefore, the disk spindle may remain powered off most of time to reduce power consumption and extend battery life. The system reliability and performances may be improved at the same time. According to various embodiments, the NVM may be designed (or configured) to keep OS data and frequently used applications and files in the NVM to save energy and improve system performances.

According to various embodiments, the user of the system (in other words: of the server) may move data between the NVM and the disk through web based Graphic User Interface (GUI) on their hand phones.

Figure 8:
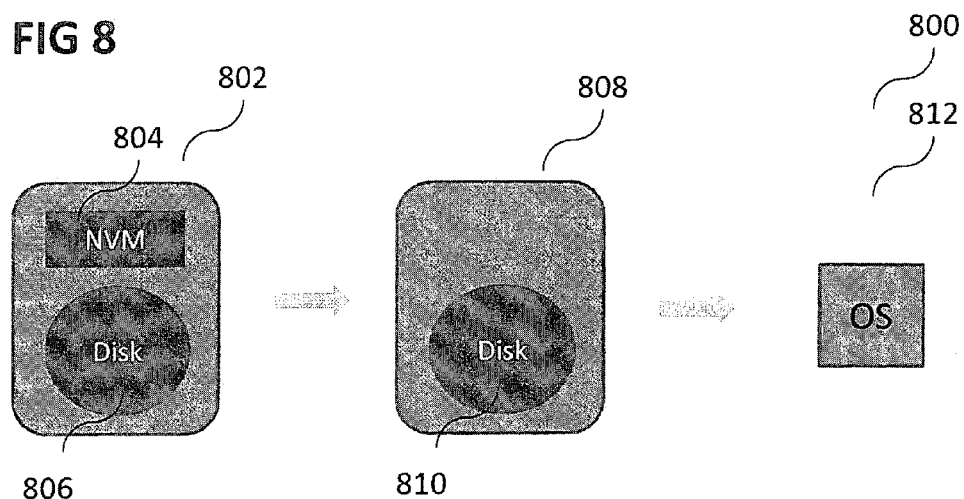
FIG. 8 shows a hybrid drive according to various embodiments.

FIG. 8 shows a hybrid drive 800 according to various embodiments. The hybrid drive 800 may have two different storage media, for example a NVM 804 and a disk 806, like illustrated in a first illustration 802. The hybrid drive 800 may export the NVM 804 and the disk 806 only as a single device with a continuous storage capacity of the disk media 810, like illustrated in a second illustration 808. After mounting the NFS to the mobile device (for example the Android phone), the user may not see the NVM storage, only the hybrid drive (in other words, the disk media), like illustrated in a third illustration 812. In other words, the NVM 804 is not just hidden, but logically integrated to the disk 806 to form the disk media 808.

Mounting the server through NFS, users only may see a single storage, and therefore, he/she may not be able move data between NVM and media.

According to various embodiments, automatic file allocation and caching policies may be desired and provided in the server for data movement to save energy and improve performances. According to various embodiments, a web browser based UI (user interface) may be provided for the mobile device (for example for the android phone) users to manage the data cached in the NVM.

Figure 9:
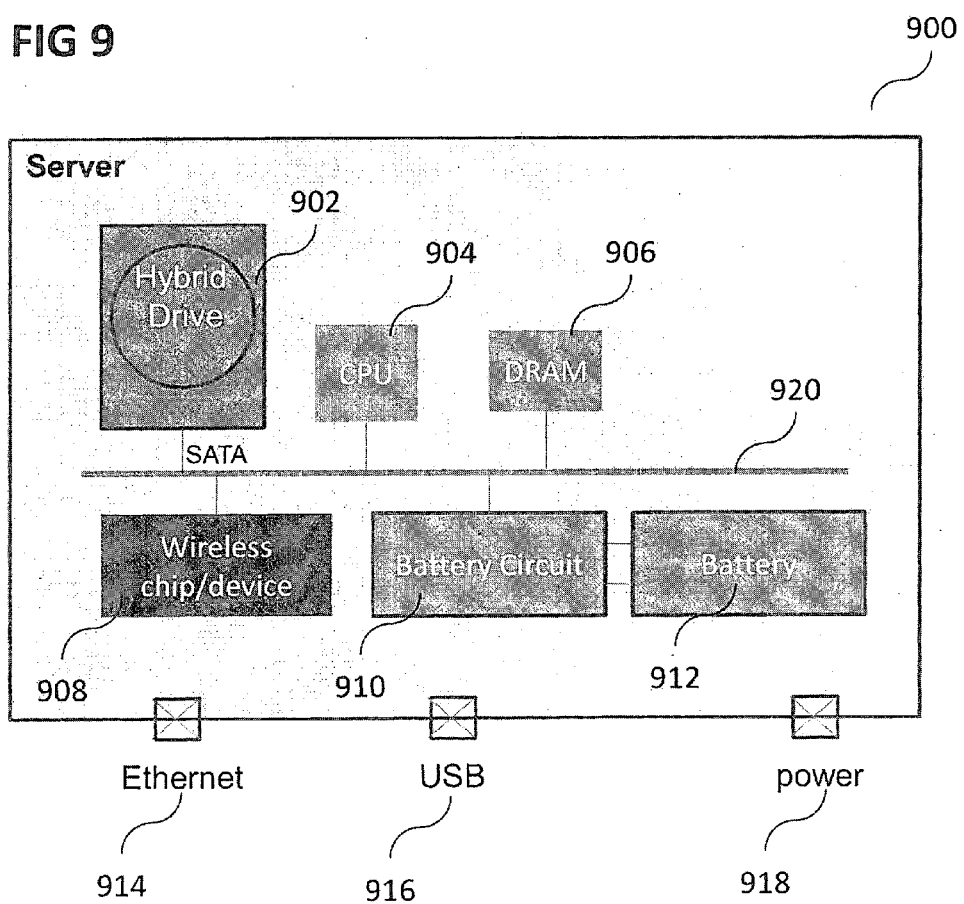
FIG. 9 shows a system with a drive, for example a hybrid drive, according to various embodiments.

FIG. 9 shows a system (for example a mobile server) 900 with a drive, for example a hybrid drive 902, according to various embodiments. FIG. 9 shows major hardware components inside one embodiment of the system 900. The storage shown in FIG. 9 may be a hybrid disk (in other words: a hybrid drive) 900, which has an embedded NVM inside. Besides storage 900, the major components, which may be connected using a SATA (serial ATA) connection 920, may be CPU (central processing unit) 904, DRAM (dynamic random access memory) 906, a wireless circuit 908, a battery circuit 910, and a battery 912. The system 900 may communicate with other devices through wireless connection such as WIFI or wire connection such as USB (universal serial bus) 916, or Ethernet 914, for example. The server 900 may further include a power supply plug 918.

Figure 10:
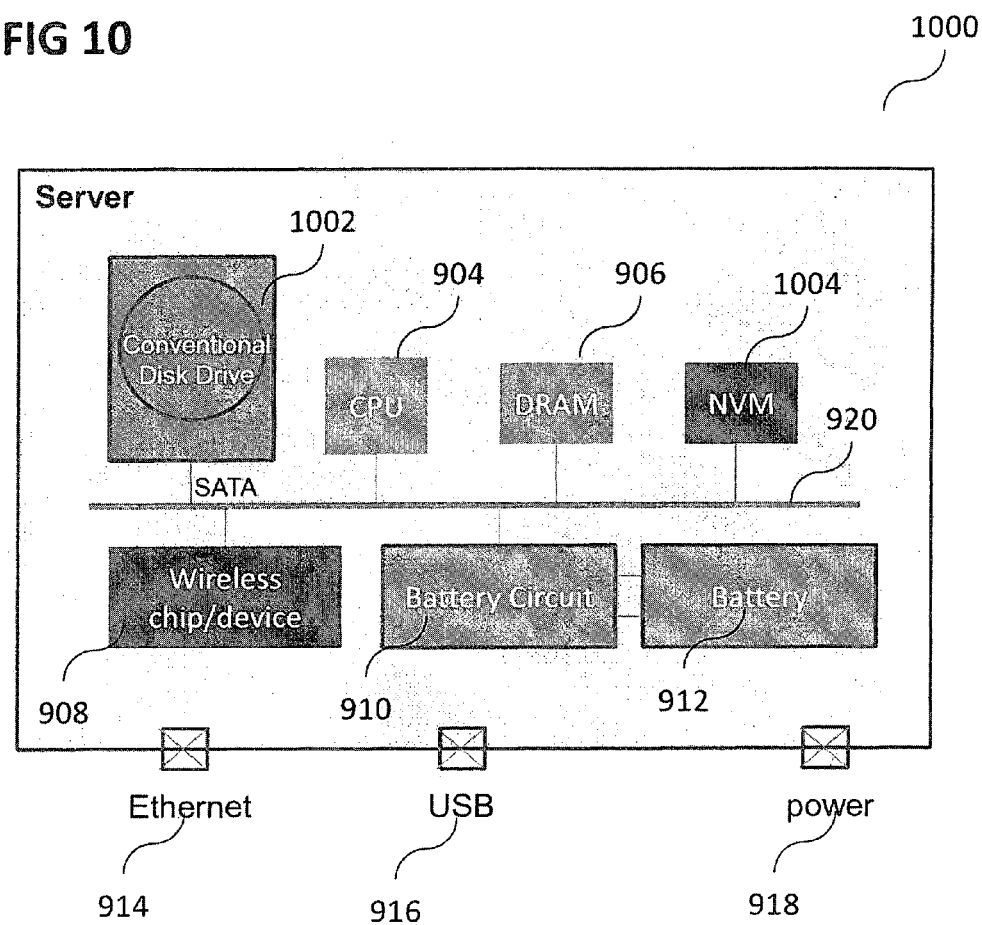
FIG. 10 shows a system with a conventional disk drive, according to various embodiments.

FIG. 10 shows a system (for example a mobile server) 1000 with a conventional disk drive 1002, according to various embodiments. Various parts of the system 1000 are similar or identical to the system 900 shown in FIG. 9, and duplicate description may be omitted. A difference between the system 900 of FIG. 9 and the system 1000 of FIG. 10 may be the location of the NVM. In the system 900 of FIG. 9, the NVM may be embedded inside the disk drive 902, while in the system 1000 of FIG. 10, the NVM 1004 may be mounted on a main circuit board of the system 1000. According to various embodiments, the system 1000 may have the NVM at both locations, for example the system 1000 may have a hybrid disk drive (for example the hybrid disk drive 902 shown in FIG. 9) and the NVM 1004 on the main circuit board at the same time.

Figure 11:
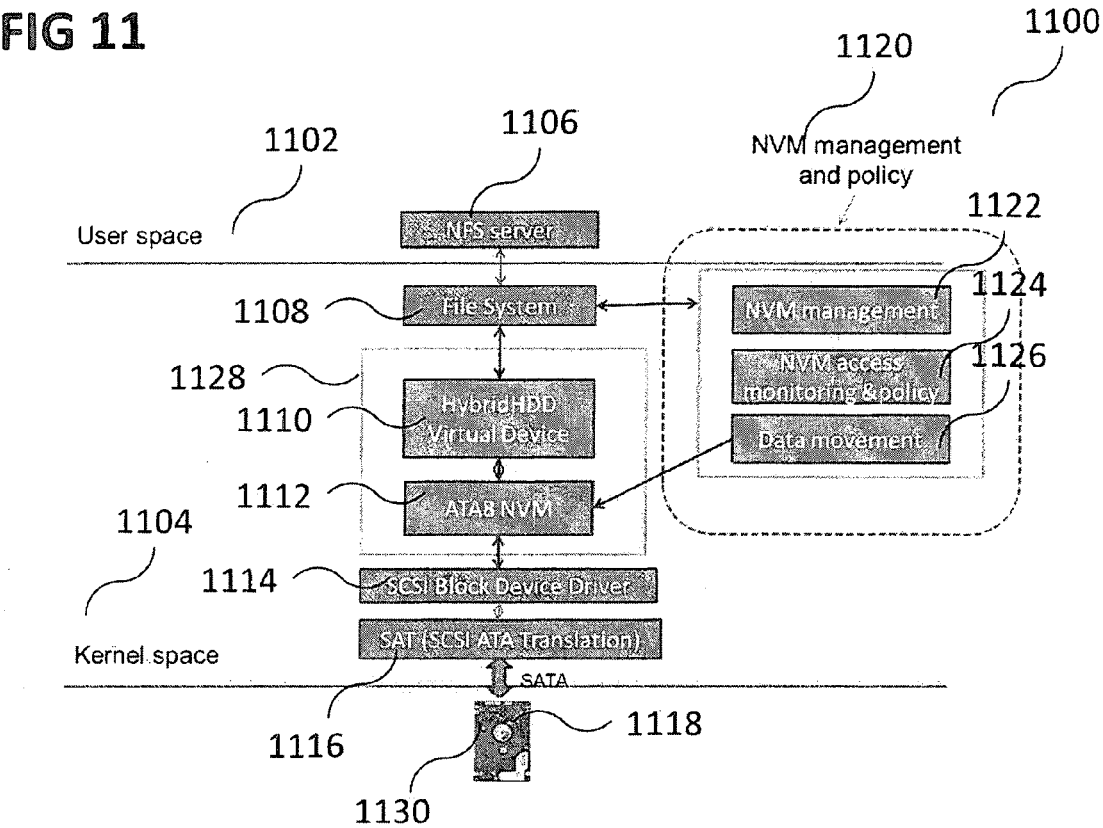
FIG. 11 shows an illustration of main components (or modules) of a system (in other words: a mobile server) according to various embodiments.

FIG. 11 shows an illustration 1100 of main components (or modules) of a system (in other words: a mobile server) according to various embodiments. The system may be installed with Linux and configured as NFS server. A user space 1102 and a kernel space 1104 are illustrated. In the user space 1102, an NFS server 1106 may be provided. There may be two major modules in the kernel. One may be the device driver module 1128 (including a hybrid HDD (hard disk drive) virtual device module 1110 and an ATA8 (AT attachment 8) NVM module 1112) configured to access the hybrid disk drive and the other one may be the NVM management and policy module 1112. The kernel space 1104 may further include a file system 1108, a SCSI block device driver 1114, and a SAT (SCSI ATA (AT attachment) translation) 1116. The SAT 1116 may communicate with the hybrid disk drive 1118 using an ATA interface 1130.

The device driver module 1128 for a hybrid disk drive 1118 may be configured to send standard command sets to PIN (wherein PIN for example may be an ATA-8 command that pins LBA (Logical block addressing) in the pinned table set)/UNPIN data to/from the NVM. The device drive module 1128 may also include an NVM data management sub-module 1112 so that the information of the data in the NVM can be easily accessed.

The NVM management and policy module 1120 may be designed at the file system level. It may include three main sub-modules. They are NVM data management 1122, NVM access monitor and policy 1124 and data movement 1126. The NVM data management 1122 sub-module may manage file level information of the data in the NVM 1118. The NVM access monitor and policy sub-module 1124 may monitor and record data access patterns at the file level. Based on the access patterns, a policy for data allocation, eviction and movement may be provided. The data movement sub-module 1126 may include or may be an interface to issue the block-level commends through the device driver module 1128 to the hybrid disk.

According to various embodiments, a guideline for automatic data management, allocation and movement (in other words: a data allocation and cache policy) may be as follows:

For new application installation, if the size is smaller than predefined threshold, install it to the NVM, or else to the disk media;

For newly created user files, locate them in the NVM; once the data grows and its size bigger than predefined threshold, move to the disk media;

Data monitoring may always be running at background and data movements may only be scheduled once the disk is powered up (or powered on) to serve incoming requests if possible.

According to various embodiments, users may manually move data between the NVM and the disk through web based Graphic User Interface (GUI) on their hand phones.

For the case if the disk storage is not a hybrid disk drive and the NVM is outside of the disk drive as shown in the FIG. 10, the NVM storage and disk storage may be managed by two different file systems. The hybrid disk device driver module 1128 may not be needed and the NVM management and policy module 1124 may be implemented at the user level.

Figure 12:
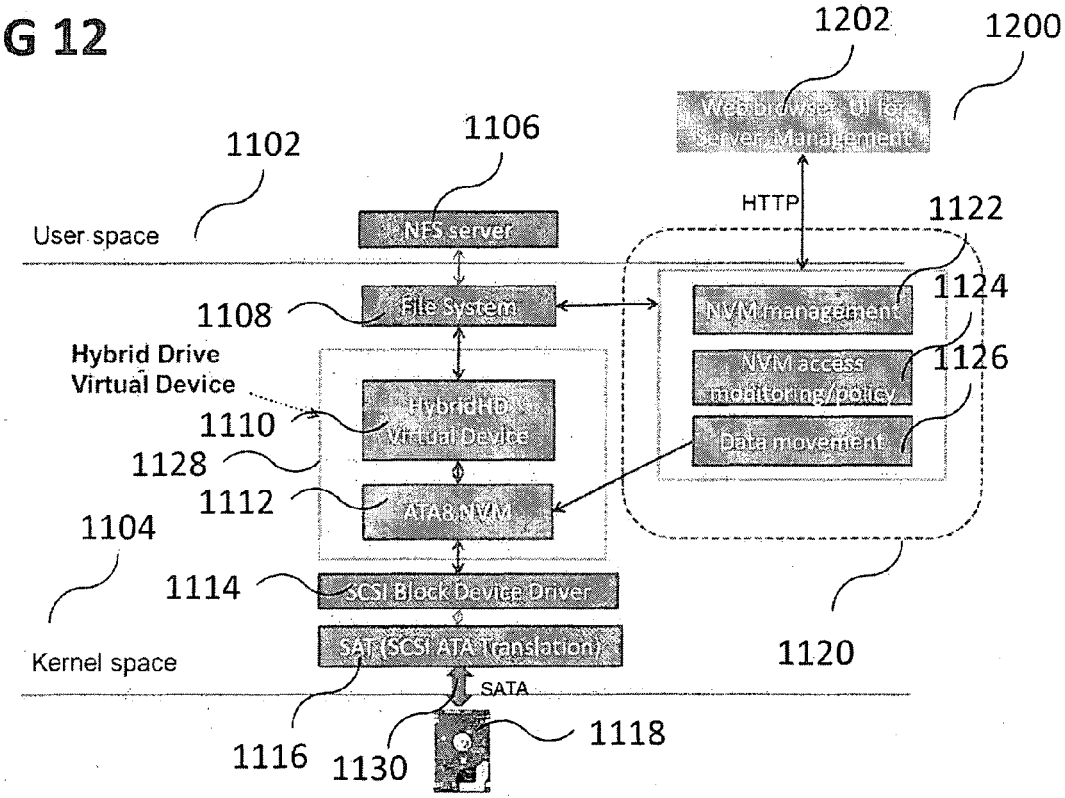
FIG. 12 shows an illustration of an architecture for management of the system.

FIG. 12 shows an illustration 1200 of an architecture for management of the system (in other words: server). Various components of the illustration 1200 of the server architecture are similar or identical to those of illustration 1100 of FIG. 11, and duplicate description may be omitted. According to various embodiments, a user interface (UI), for example a web browser UI, 1202 for server management may be provided. With this, through hand phones, the user may manage the system through the web-based GUI. Examples of the management (in other words: the Hybrid Drive Management) that may be implemented (for example through HTTP (hypertext transfer protocol)) may be as follows:

View the data in the NVM;
Move data between the NVM and disk;
View (file) access pattern;
View the (Hybrid Drive) power usage;
Password setting;
Account management; and/or
others.

According to various embodiments, user input on data caching may be provided. A web browser based UI may be developed for the users of the mobile device (for example for android users) to manage the data in the NVM. Other ways to get user input may be to modify applications (for example Android applications) for programming installation and data saving. i.e. to design a popup window to ask users on the locations to install a program or save a file. This may be provided by modifying application programs in existing mobile devices (for example android phones).

Figure 13:
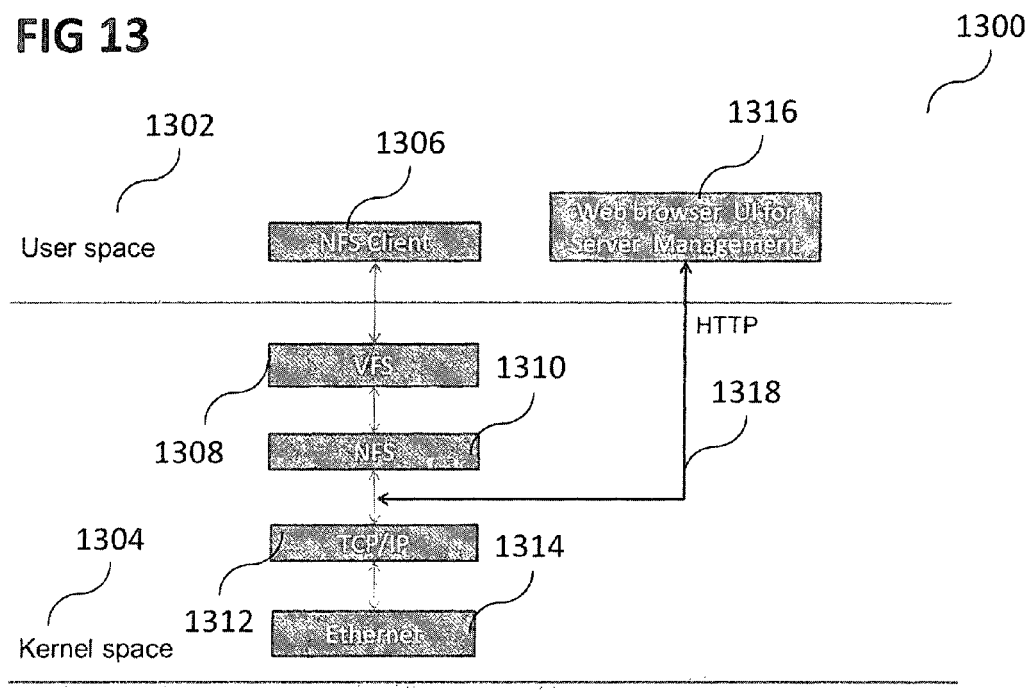
FIG. 13 shows a hand phone architecture for data management of the system according to various embodiments.

FIG. 13 shows a hand phone architecture 1300 for data management of the system (in other words: of the server) according to various embodiments. A user space 1302 and a kernel space 1304 are shown. An NFS client 1306 may be provided in the user space. A VFS 1308, an NFS 1310, a TCP/IP module 1312, and an Ethernet module 1314 may be provided in the kernel space 1304. In the architecture of a hand phone shown in FIG. 13, a web-based GUI 1316 may be provided and installed in the hand phone. Through the GUI 1316, users may manage the system according to various embodiments, for example using HTTP 1318.

Figure 14:
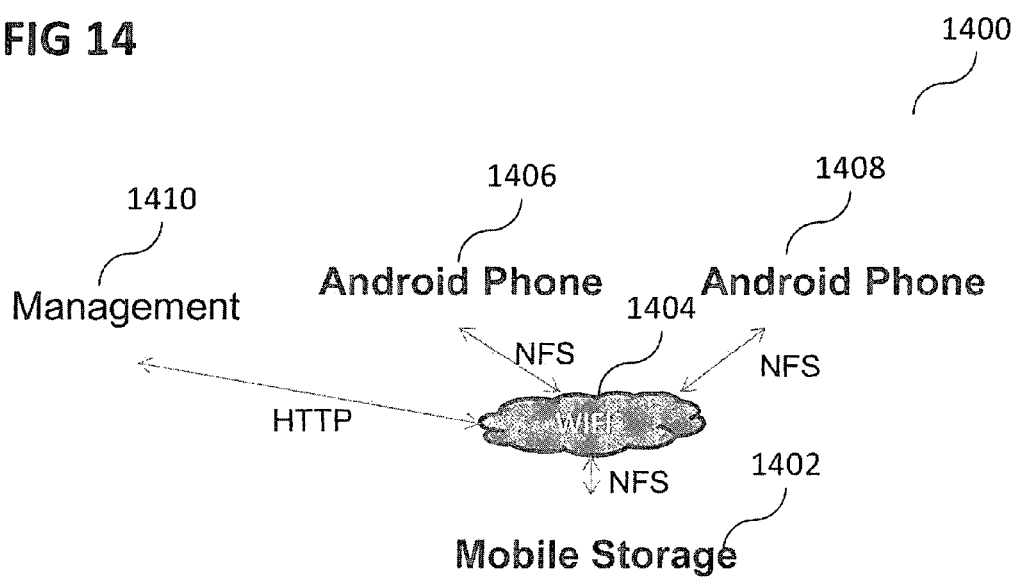
FIG. 14 shows a system including a hybrid drive mobile storage according to various embodiments.

FIG. 14 shows a system 1400 including a hybrid drive mobile storage 1402 according to various embodiments. A plurality of mobile devices (for example a first mobile device 1406 and a second mobile device 1408) may access the mobile storage 1402 using WiFi 1404. Furthermore, management 1410 of the mobile storage 1402 may be provided using HTTP.

According to various embodiments, an external storage device (for example a wireless Hybrid Drive) may be provided for hand phone as if it is a local storage. According to various embodiments, NFS may be used. For example, for android phones that support NFS, users may root the phone or install apps in order to mount NFS. For example for android phones that do not support NFS, rebuilding the kernel may be rebuilt. To enable-booting, the kernel image may be rebuilt.

According to various embodiments, a NV cache data allocation and management policy may be provided and configured to keep OS data and frequently used applications and files in the cache. According to various embodiments, an automatic cache policy based on file access patterns (for example frequency or size) and user management through HTTP may achieve low energy consumption and high performances.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile server configured to expand memory of one or more cellular phones, the mobile server comprising:
   a first memory configured to store first data of a first kind;
   a second memory configured to store second data of a second kind;
   a wireless transceiver configured to (i) transmit the first data and the second data from the mobile server to a first cellular phone, and (ii) receive the first data and the second data from the first cellular phone, wherein the wireless transceiver is configured to transfer the first data and the second data to and from the first cellular phone when at least one program executes on the first cellular phone, and wherein at least one of the first data or the second data includes code of the at least one program;
   a control circuit configured to provide the first cellular phone access to the first memory and the second memory, such that the first memory and the second memory expand storage capacity of the first cellular phone, wherein the one or more cellular phones include the first cellular phone; and
   a memory selection circuit configured to determine whether to store (i) the first data in the first memory or the second memory, and (ii) the second data in the first memory or the second memory.

2. The mobile server of claim 1, wherein:
   the first memory comprises a hard disk drive; and
   the second memory comprises a solid-state drive.

3. The mobile server of claim 1, wherein data of the first kind comprises data of a file size of more than a predetermined size.

4. The mobile server of claim 1, wherein data of the second kind comprises at least one of operating system data, file system metadata, applications, or applications run time data.

5. The mobile server of claim 1, wherein data of the first kind comprises data of an access frequency less than a pre-determined frequency.

6. The mobile server of claim 1, further comprising a data move circuit configured to, based on control information, one of (i) move data from the first memory to the second memory, or (ii) move data from the second memory to the first memory, wherein the control circuit is configured to receive the control information from the first cellular phone.

7. The mobile server of claim 6, wherein the control circuit is configured according to a hypertext transfer protocol.

8. The mobile server of claim 1, wherein the wireless transceiver is configured according to at least one of a network file system protocol or a Common Internet File System protocol.

9. The mobile server of claim 1, wherein:
   the wireless transceiver is configured to communicate with a plurality of radio communication devices of a plurality of cellular phones;
   the first memory comprises a plurality of first portions;
   each of the plurality of first portions is configured to store data of a first kind for a respective one of the plurality of radio communication devices;
   the second memory comprises a plurality of second portions; and
   each of the plurality of second portions is configured to store data of a second kind for a respective one of the plurality of radio communication devices.

10. The mobile server of claim 1, wherein the control circuit is configured to provide the first cellular phone access to the first memory and the second memory as if the first memory and the second memory are part of internal storage of the first cellular phone.

11. The mobile server of claim 1, wherein the memory selection circuit is configured to:
    based on a size of a file of the first data, determine whether to store the first data in the first memory or the second memory; and
    based on a size of a file of the second data, determine whether to store the second data in the first memory or the second memory.

12. The mobile server of claim 1, wherein the memory selection circuit is configured to:

based on an access frequency of the first data, determine whether to store the first data in the first memory or the second memory; and
based on an access frequency of the second data, determine whether to store the second data is in the first memory or the second memory.

13. The mobile server of claim 1, wherein the memory selection circuit is configured to:
based on a type of a file of the first data, determine whether to store the first data in the first memory or the second memory; and
based on a type of a file of the second data, determine whether to store the second data in the first memory or the second memory.

14. The mobile server of claim 1, wherein the memory selection circuit is configured to:
based on control information received from the first cellular phone, determine whether to store the first data in the first memory or the second memory; and
based on control information received from the first cellular phone, determine whether to store the second data in the first memory or the second memory.

15. The mobile server of claim 1, wherein:
the one or more cellular phones comprises a second cellular phone; and
the wireless transceiver is configured to provide the first cellular phone access to the first memory and the second memory while providing the second cellular phone access to the first memory and the second memory.

16. The mobile server of claim 1, wherein:
the wireless transceiver receives a broadcast signal from the first cellular phone;
the broadcast signal is sent to the wireless transceiver to locate the mobile server;
the wireless transceiver is configured to establish a communication link with the first cellular phone subsequent to the first cellular phone identifying the mobile server; and
the control circuit is configured to, subsequent to establishing the communication link, access a kernel image from the first memory or the second memory and transmit the kernel image to the first cellular phone.

17. The mobile server of claim 16, wherein the wireless transceiver is configured to setup a network file system connection with the first cellular phone subsequent to accessing the kernel image and subsequent to the first cellular phone executing an operating system.

18. The mobile server of claim 1, further comprising:
a user space comprising a network file system server; and
a kernel space comprising
a file system connected to the network file system server,
a hybrid hard disk drive virtual device connected to the file system and a non-volatile memory management module,
an advanced technology attachment non-volatile memory module connected to the non-volatile memory management module,
a small computer system interface block device driver, and
a small computer system interface advanced technology attachment connected to a hard disk drive and driven by the small computer system interface block device driver.

19. The mobile server of claim 1, further comprising:
a user space comprising a network file system server; and
a kernel space comprising
a virtual file system,
a network file system,
a transmission control protocol/Internet protocol device, and
an Ethernet interface.

20. The mobile server of claim 1, wherein:
the at least one program includes a first program and a second program;
the first program is stored in the first memory; and
the second program is stored in the second memory.

21. The mobile server of claim 20, wherein:
the wireless transceiver is configured to transfer the first data to and from the first cellular phone during execution of the first program on the first cellular phone;
the first data includes code of the first program;
the wireless transceiver is configured to transfer the second data to and from the first cellular phone during execution of the second program on the first cellular phone; and
the second data includes code of the second program.

22. The mobile server of claim 1, wherein the second data includes code of the at least one program.

23. The mobile server of claim 1, wherein the second memory is partitioned, such that a first portion of the second memory stores operating system code and server applications and a second portion of the second memory stores frequently accessed program applications and frequently accessed data.

24. A method for controlling a mobile server, wherein the mobile server comprises a first memory and a second memory, the method comprising:
storing via a control circuit first data of a first kind in the first memory;
storing via the control circuit second data of a second kind in the second memory;
providing a first cellular phone access to the first memory and the second memory via a control circuit, such that the first memory and the second memory expand storage capacity of the first cellular phone;
transmitting the first data and the second data from the mobile server to the first cellular phone via a wireless transceiver;
receiving the first data and the second data from the first cellular phone via the wireless transceiver,
wherein the first data and the second data are transferred to and from the first cellular phone via the wireless transceiver when at least one program executes on the first cellular phone, wherein at least one of the first data or the second data includes code of the at least one program; and
determining via a memory selection circuit whether to store (i) the first data in the first memory or the second memory, and (ii) the second data in the first memory or the second memory.

25. The method of claim 24, wherein the first memory comprises a hard disk drive.

26. The method of claim 24, wherein the second memory comprises a solid-state drive.

27. The method of claim 24, wherein data of the first kind comprises data of a file size of more than a predetermined size.

28. The method of claim 24, wherein data of the second kind comprises at least one of operating system data, file system metadata, applications, or applications run time data.

29. The method of claim 24, wherein data of the first kind comprises data of an access frequency less than a predetermined frequency.

30. The method of claim 24, further comprising:
receiving control information at the mobile server; and
based on the received control information, one of moving the first data from the first memory to the second memory or moving the second data from the second memory to the first memory.

31. The method of claim 30, further comprising receiving the control information according to a hypertext transfer protocol.

32. The method of claim 24, further comprising, according to at least one of a network file system protocol or a common internet file system protocol, (i) transmitting the first data and the second data to the first cellular phone, and (ii) receiving the first data and the second data from the first cellular phone.

33. The method of claim 24, further comprising:

transmitting the first data and the second data to and receiving the first data and the second data from a plurality of radio communication devices of a plurality of cellular phones, wherein the plurality of cellular phones include the first cellular phone, wherein the first memory comprises a plurality of first portions, and the second memory comprises a plurality of second portions;

storing in each of the plurality of first portions the first data of the first kind in a respective one of the plurality of radio communication devices; and storing in each of the plurality of second portions the second data of the second kind in a respective one of the plurality of radio communication devices.

* * * * *